United States Patent
Muhr

[19]

[11] Patent Number: 6,117,219
[45] Date of Patent: Sep. 12, 2000

[54] ARRANGEMENT FOR AIR HUMIDIFICATION AND FOR AIR WASHING

[76] Inventor: Hans Muhr, Auf der Haide 1, A-1220, Vienna, Austria

[21] Appl. No.: 09/125,961

[22] PCT Filed: Feb. 26, 1997

[86] PCT No.: PCT/AT97/00034

§ 371 Date: Aug. 26, 1998

§ 102(e) Date: Aug. 26, 1998

[87] PCT Pub. No.: WO97/32166

PCT Pub. Date: Sep. 4, 1997

[30] Foreign Application Priority Data

Feb. 27, 1996 [AT] Austria ........................................ 362/96

[51] Int. Cl.⁷ ..................................................... B01D 47/06
[52] U.S. Cl. .............................. 96/224; 96/327; 261/106; 261/112.1
[58] Field of Search .............................. 96/224, 245, 247, 96/255, 267, 272, 273, 322, 326–328; 239/17–23; 261/103, 106, 112.1, DIG. 14

[56] References Cited

U.S. PATENT DOCUMENTS

| | | | |
|---|---|---|---|
| 2,172,646 | 9/1939 | Walker | 261/112.1 X |
| 2,345,859 | 4/1944 | Randolph | 96/327 X |
| 2,638,644 | 5/1953 | Rauhut | 96/224 X |
| 2,752,137 | 6/1956 | Brendel et al. | 261/112.1 |
| 2,872,167 | 2/1959 | Pratt | 261/112.1 X |
| 3,502,140 | 3/1970 | Dawson | 261/112.1 X |
| 4,217,315 | 8/1980 | Keeler, II | 261/120 |
| 4,351,781 | 9/1982 | Blatter | 261/106 X |
| 4,428,890 | 1/1984 | Harrell | 261/106 X |
| 4,747,538 | 5/1988 | Dunn et al. | 261/103 X |

FOREIGN PATENT DOCUMENTS

| | | |
|---|---|---|
| 373 378 | 5/1983 | Austria . |
| 391 753 | 5/1990 | Austria . |
| 25 34 524 | 2/1977 | Germany . |
| 43 29 209 A1 | 3/1994 | Germany . |
| 94 21 327 | 11/1995 | Germany . |
| 295 19 950 | 4/1996 | Germany . |

*Primary Examiner*—Robert H. Spitzer
*Attorney, Agent, or Firm*—Herbert Dubno

[57] ABSTRACT

A device for humidifying and washing air in which a hollow body of a sculptured configuration in a collecting container is supplied with water by a recycling pump so that the water cascades down the outer surface of the body and along the inner surface thereof which can be provided with steps. A mesh can be located within the body and the body can have openings at the top and bottom for enabling air to enter and leave the interior of the body.

5 Claims, 1 Drawing Sheet

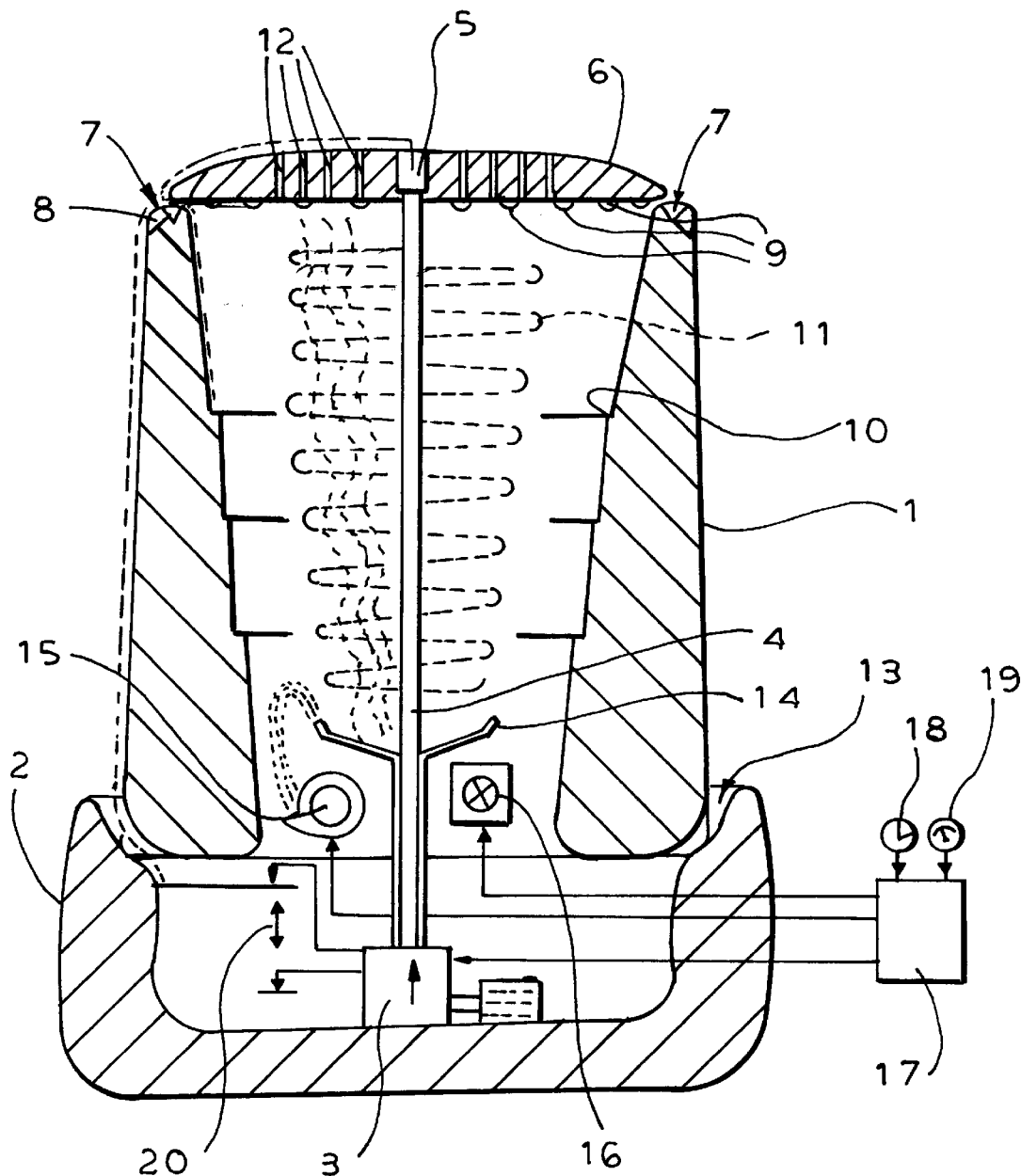

ARRANGEMENT FOR AIR HUMIDIFICATION AND FOR AIR WASHING

CROSS REFERENCE TO RELATED APPLICATIONS

This application is a national phase of PCT/AT97/00034 filed Feb. 26, 1997 and based in turn upon Austrian national application A362/96 of Feb. 27, 1996 under the International Convention.

FIELD OF THE INVENTION

The invention relates to a device for air humidifying and air washing in rooms, and consists essentially of a water guiding body shaped as a stone sculpture, the surface of which is completely wetted with water flowing down from at least one discharge opening into a collecting container from which it is pumped to the discharge openings by a pump, the water guiding body being hollow with ventilation openings.

BACKGROUND OF THE INVENTION

There are air humidifiers on the market which either operate on the principle of a heated water vessel, with centrifugal disks or by electronic atomizers that disintegrate the water into tiny droplets.

Austrian Patent 391 753 discloses a device for the humidification of air which consists of a vertical pipe socket into the interior of which water droplets fall against upstreaming air down into a collecting container, just as in a sprinkling installation, from where the water is pumped up again and disintegrated into single droplets by a perforated disk. This device is noisy and the droplets hit the water in the container with an audible splash. Some of the moisture already taken up by the upstreaming air is lost again when the air bubbles through the water in the perforated bottom of a water container.

The apparatus described in German Patent Document DE 43 29 209 A1 has a vessel with a built-in trickling installation and splash plates for water through which air is led. The apparatus is in the category of technological air humidifiers, especially for ventilation or air conditioning installations.

Many types of existing types of humidifier are hygrostatically controlled or are equipped with a time control. The first above-mentioned type of humidifier, often referred to as "water kettle", has a low noise level but a high energy demand. The second type, though lower in energy demand, is characterized by irritating noises from the motors for the centrifugal disks or the fans.

A humidifier has been developed, as described in Austrian Patent 373 378 B, which features a water guiding body with a surface over which the water flows, fully covering the surface, which is as large as possible.

The guiding body is situated in a water collecting container from which the water is drawn by a pump and delivered upwards through a central hole in the body.

The intake is adjusted so that the whole surface of the guiding body is covered with water, thus obtaining a rather high rate of evaporation. The water guiding body is designed by an artist and the collecting container, which is also made from stone, complements the overall aesthetic impression. Depending on the adjustment of the intake, the noise to be heard is a soft water murmur or splashing, which is pleasant and calming, for offices as well as for conference, meeting and waiting rooms.

In this connection German Patent Document DE 25 34 524 A1 describes a humidifier which, like a picture, is mounted on a wall and consists of a frame-like housing whose back is shaped as a three-dimensional wall with protruding cascades. The surface of this wall acts as a water guiding body and is thus supplied with water which is collected in the bottom part of the frame and then repumped to the upper portion. This cascade relief humidifies the air passing over the area within the frame. One version shows an integral design of frame and wall, giving the impression of a cascade in the rear of a goggle-box picture. The performance of a humidifier based on natural surface evaporation must be carefully adjusted to the air volume of the room. Large rooms such as cashier areas in banks and hotel lobbies require comparatively large water guiding bodies, and certain areas require intensive air humidifying although there is not enough room for large fountains. Another point to be considered is that large vaporizing units with large surfaces are very heavy and thus often cannot be installed on the upper floors of buildings without appropriate reinforcement of the floor or the ceiling.

OBJECT OF THE INVENTION

It is the object of the invention to improve the efficiency of a device for air humidifying and air washing as described above.

SUMMARY OF THE INVENTION

This is affected by dividing the water volume flowing from the water discharge openings into several partial water streams, with one partial stream being guided over the outer surface and another over the inner surface of the hollow body, and by providing the bottom and the top section of the hollow body with ventilation openings.

The evaporation area thus comprises not only the outer surface of the water guiding body, but also the inner surface of the hollow water guiding body. The ventilation openings provide a chimney affect by which the humidity created in the inside of the hollow body is carried to the outside. The water flows down on the inside of the hollow body without making a noise.

A further improvement in humidity transfer is obtained by the provision of steps on the inner surface of the hollow body against which some of the water volume is guided and thus disintegrated into droplets.

Only the structure of the inner surface e.g. with protrusions such as steps, causes water droplets to separate from the inside water stream and turns water into a water mist inside the hollow body.

A further improvement can be achieved by placing an insert body with a large wettable surface inside the hollow body, e.g. a filter-like wire mesh, with its top and situated opposite at least one water feed opening.

The insert body is sprinkled as if from a shower and the drops and droplets, including those that have disintegrated from the water layer on the inside surface of the hollow body, spread over the whole volume of the wire mesh. Natural circulation moves the humidified air from the hollow body. The water droplets sink very slowly through the insert body. Unlike the free splashing of droplets into a water container, there is no creation of noise. Additional water atomizing in the interior, of the guiding body is possible, as it is practically encased, and no water sprays to the outside.

It may be advantageous also to include spraying nozzles which are noise protected by the hollow body, a standard fan and a standard heating device, as well as a UV source for killing germs. In addition to providing support, the device is space-saving saving and reduces noise. The spraying or atomization nozzles are fed by a pump, e.g. the pump which delivers the water from the collecting container to the highest point of the guiding body. The natural circulation inside the hollow body and out of it may be intensified by a heat source. A UV light source kills germs. The rising heat intensifies air circulation and water evaporation.

A fan with an enclosed electric drive helps to disintegrate water particles and to transport the humid air to the outside. An air stream, e.g. in a pressure line, may be combined with a water nozzle for the production of very tiny water droplets.

As already mentioned, a pump delivers water from a tray-shaped collecting container, in which the whole guiding is situated, up to the highest point of the guiding body where the water is discharged through one or several openings. It is advantageous to divide the water volume into several partial volumes defending upon the number of the discharge openings and to lead one partial volume over the outside surface and another over the inside surface of the hollow body.

The water discharge openings may be located in a dome-shaped cover plate in the top section of the hollow body which, when removed, permits access to the interior of the body and hence, for example, the withdrawal of the insert body for maintenance purposes.

The rim of the cover plate rests on a groove running around the top end of the body.

The water flows across the cover into the groove and is led by recesses in the body partly to the outside and partly to the inside of the body. The cover rests on the portions between the recesses. The recesses are used also as ventilation openings. A special version is distinguished by the provision of a time or humidity related control system which controls the water volumes via solenoid valves, the spraying and atomizing nozzles, if installed, and the supply valves, the heater, the fan and the pump or pumps by electric activation of deactivation. Thus, a cashier area in a bank may have its air humidifying equipment working at full power during the night when the noise created by the fan is irrelevant and have the noisier components cut out during daytime. The heater may be activated for higher humidity requirements, and higher humidity achieved during night hours may be preserved by the humidity gain from the action of the interior section of the hollow body only. The soft splashing of the water dripping from the insert body is often regarded as a pleasant sound and thus added also during the day. The selection is made via the control which can be either time- or humidity related ("demand related").

BRIEF DESCRIPTION OF THE DRAWING

The above and other objects, features, and advantages will become more readily apparent from the following description, reference being made to the sole FIGURE of which is a cross section of the device of the invention.

SPECIFIC DESCRIPTION

A water guiding body is positioned in a collecting container which permits water to be supplied by a pump through a line to a water discharge opening in a cover plate from which it flows across the surface of the water guiding body 1 back into the collecting container. The guiding body 1 shown is a stone sculpture of any suitable shape that can offer a surface upon which the discharged water will flow downwards in a layer covering the surface as completely as possible.

The water guiding body 1 is a hollow body. A water stream coming from the water discharge opening 5 is divided and one partial stream flows down the outside surface and another down the inside of the guiding body 1.

The division of the water stream is affected by a groove 7 running around the top portion of the guiding body 1 and recesses 8 and 9 which open alternatively towards the inner and to the outer surface of the guiding body. The water flowing over the cover plate 6 into the groove 7 is thus divided by the recesses 8 and 9 into the above-mentioned two partial streams. The recesses 8 and 9 act also as ventilating openings at the top. The water return openings 13 at the bottom also act as ventilating openings.

This means that the water guiding body 1 has two separate surfaces for evaporation. While the outer surface of the body 1 is kept smooth to avoid water splashing, the inner surface is furnished with steps 10 which cause splashing of the return water in the interior of the hollow body 1 and thus enhance the efficiency of the device. The inner space of the body 1 contains an insert body 11 in the form of a sturdy wire mesh or a set of perforated tin disks, arranged one above the other. The insert body 11 is sprinkled via holes 12 in the cover plate 6. The water droplets from above and those from the water splashing on the steps 10 become smaller and smaller and are continuously carried along by the circulating air in the interior of the air body 1. At the same time, this air takes up extra humidity from the water surfaces inside and is then discharged into the outside room air. The circulation of the air through the interior of the body 1 filled with water particles causes the air to be intensively filtered and washed. Additionally, atomizing or spray nozzles 14 may also be provided in the device, connected via pressure lines to the pump 3. A fan 15 is installed for improved circulation, and the heating source 16 (e.g. an UV lamp) will enhance the circulation.

A control system 17 is connected to a timer 18 and to a hygrometer 19. A water level control instrument regulates the set water volume within a range 20. The control system 17 activates pump 3 and controls the delivery volume (pump speed). It switches on and off, depending on time and measured air humidity, the fan 15, the spraying nozzles 14 and the heating device 16.

The control system also allows for only low-noise components to be operated during daytime and for components with slightly whirring operating sounds to be switched on only during the night. A certain amount of operating noise during daytime will certainly be accepted while night operation has to be rather quiet. The device with its increased efficiency compared to existing systems may have rather small dimensions even in cases where the surrounding air is very dry or where high air humidity is required. With the components placed inside the hollow guiding body, the device is compact and very silent.

What is claimed is:

1. A device for air humidifying and air washing in rooms, comprising:
   a hollow water guiding body shaped as a stone sculpture and provided with at least one water discharge opening from which water flows down along an outer surface of the water guiding body and an inner surface of said body;
   a collecting container beneath said body and receiving water flowing down from said guiding body;
   a pump for circulating water in a closed circuit from said container to the water discharge opening, the water guiding body being provided with ventilation openings; and means for directing the water stream coming from the water discharge opening into several partial streams, with one partial stream being guided over the outer surface and another partial stream over the inner surface of the hollow body, the ventilating opening being provided in bottom and top sections of the hollow body.

2. The device according to claim 1 wherein the inner surface of the hollow body is provided with steps onto which some of the water is guided and disintegrated into droplets.

3. The device according to claim 1, further comprising an insert body with a wettable surface of wire mesh in said water guiding body, an upper end of said insert body being arranged opposite said water discharge opening.

4. The device according to claim 1 wherein an interior of the hollow body is provided with atomizing nozzles enclosed by the hollow body, a fan, a heat source and a UV light for killing germs.

5. The device according to claim 4, further comprising a humidity based electronic control system for controlling streams, the atomizing nozzles and the electric supply for the heat source, the fan and the pump.

\* \* \* \* \*